US012798057B2

(12) United States Patent
Yang

(10) Patent No.: US 12,798,057 B2
(45) Date of Patent: Nov. 17, 2026

(54) SOCKET STRUCTURE FOR HAND OPERATED TOOL

(71) Applicant: Cheng-Pu Yang, Changhua County (TW)

(72) Inventor: Cheng-Pu Yang, Changhua County (TW)

(*) Notice: Subject to any disclaimer, the term of this patent is extended or adjusted under 35 U.S.C. 154(b) by 251 days.

(21) Appl. No.: 18/799,354

(22) Filed: Aug. 9, 2024

(65) Prior Publication Data

US 2026/0042190 A1 Feb. 12, 2026

(51) Int. Cl.
*B25B 13/10* (2006.01)

(52) U.S. Cl.
CPC .................................. *B25B 13/102* (2013.01)

(58) Field of Classification Search
CPC ..... B25B 13/102; B25B 13/105; B25B 13/06; B25B 23/0035
USPC .................................. 81/124.5, 124.6, 125.1
See application file for complete search history.

(56) References Cited

U.S. PATENT DOCUMENTS

| | | | | |
|---|---|---|---|---|
| 1,507,362 A * | 9/1924 | Bartosik | ............... | B25B 13/488 81/57.32 |
| 6,109,142 A * | 8/2000 | Learng | .................. | B25B 13/102 81/DIG. 11 |
| 11,090,782 B2 | 8/2021 | Chiang | | |

* cited by examiner

*Primary Examiner* — Hadi Shakeri
(74) *Attorney, Agent, or Firm* — LANWAY IPR SERVICES; Chun-Ming Shih

(57) ABSTRACT

A socket structure for a hand operated tool includes a first body, a second body, a first elastic member, and a first locking member. The first body is provided with a first rotation portion, a first mounting portion, a first abutting face, a second mounting portion, a second abutting face, and a perforation. The second body is movable in the first mounting portion and non-rotatable relative to the first mounting portion. The second body is provided with a first fitting portion, a third mounting portion, a first receiving groove, a first limit portion, and a second receiving groove. The first elastic member provides a restoring force to the second body. The first locking member extends through the first body and the second body, to prevent the second body from being detached from the first mounting portion.

10 Claims, 17 Drawing Sheets

SOCKET STRUCTURE FOR HAND OPERATED TOOL

BACKGROUND OF THE INVENTION

Field of the Invention

The present invention relates to an engaging mechanism or a socket and, more particularly, to a socket structure for a hand operated tool.

Description of the Related Art

A conventional socket was disclosed in the U.S. Pat. No. 11,090,782, and comprises a first element 1, a second element 2, and a third element 3. The first element 1 is provided with a first sleeve portion 12. The second element 2 is provided with a second sleeve portion 21. The third element 3 is provided with a third sleeve portion 31.

However, the conventional socket has the following disadvantages.

1. The conventional socket only includes the first sleeve portion 12, the second sleeve portion 21, and the third sleeve portion 31 of three different specifications, thereby limiting the versatility of the socket.
2. The restricting members 5 and the sleeve ring 6 are mounted between the first element 1 and the second element 2, to prevent the second element 2 from being detached from the first sleeve portion 12. The conventional socket includes at least two restricting members 5 so that the at least two restricting members 5 cannot be mounted in the through holes 13 easily, thereby causing inconvenience in fabrication of the socket.
3. The sleeve ring 6 is closely fitted on the first element 1 so that the operator has to exert a larger force to fit the sleeve ring 6 onto the first element 1. Alternatively, the sleeve ring 6 is closely fitted on the first element 1 by a machine. Thus, assembly of the sleeve ring 6 is not convenient.

BRIEF SUMMARY OF THE INVENTION

The primary objective of the present invention is to provide a socket structure for driving hand operated tools of at least three different specifications.

In accordance with the present invention, there is provided a socket structure comprising a first body, a second body, a first elastic member, and a first locking member. The first body has a first end and a second end. The first body is provided with a first rotation portion, a first mounting portion, a first abutting face, a second mounting portion, a second abutting face, and a perforation. The second body is mounted and movable in the first mounting portion. The second body is non-rotatable relative to the first mounting portion. The second body is provided with a first fitting portion, a third abutting face, a first mounting end, a third mounting portion, a first receiving groove, a first limit portion, and a second receiving groove. The first elastic member is elastically biased between the first abutting face and the third abutting face and provides a restoring force to the second body. The first locking member extends through the first body and the second body and is mounted on the first body, to prevent the second body from being detached from the first mounting portion.

According to the primary advantages of the present invention, the first body is provided with the first mounting portion and the second mounting portion. The second body is mounted in the first mounting portion and is provided with the third mounting portion. The first mounting portion, the second mounting portion, and the third mounting portion have different specifications, so that the socket structure is adapted to drive and rotate tools of three different specifications.

According to another advantage of the present invention, the first locking member extends through the second body and is assembled with the first body, so that the second body is assembled in the first body, thereby simplifying assembly of the second body and the first body.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
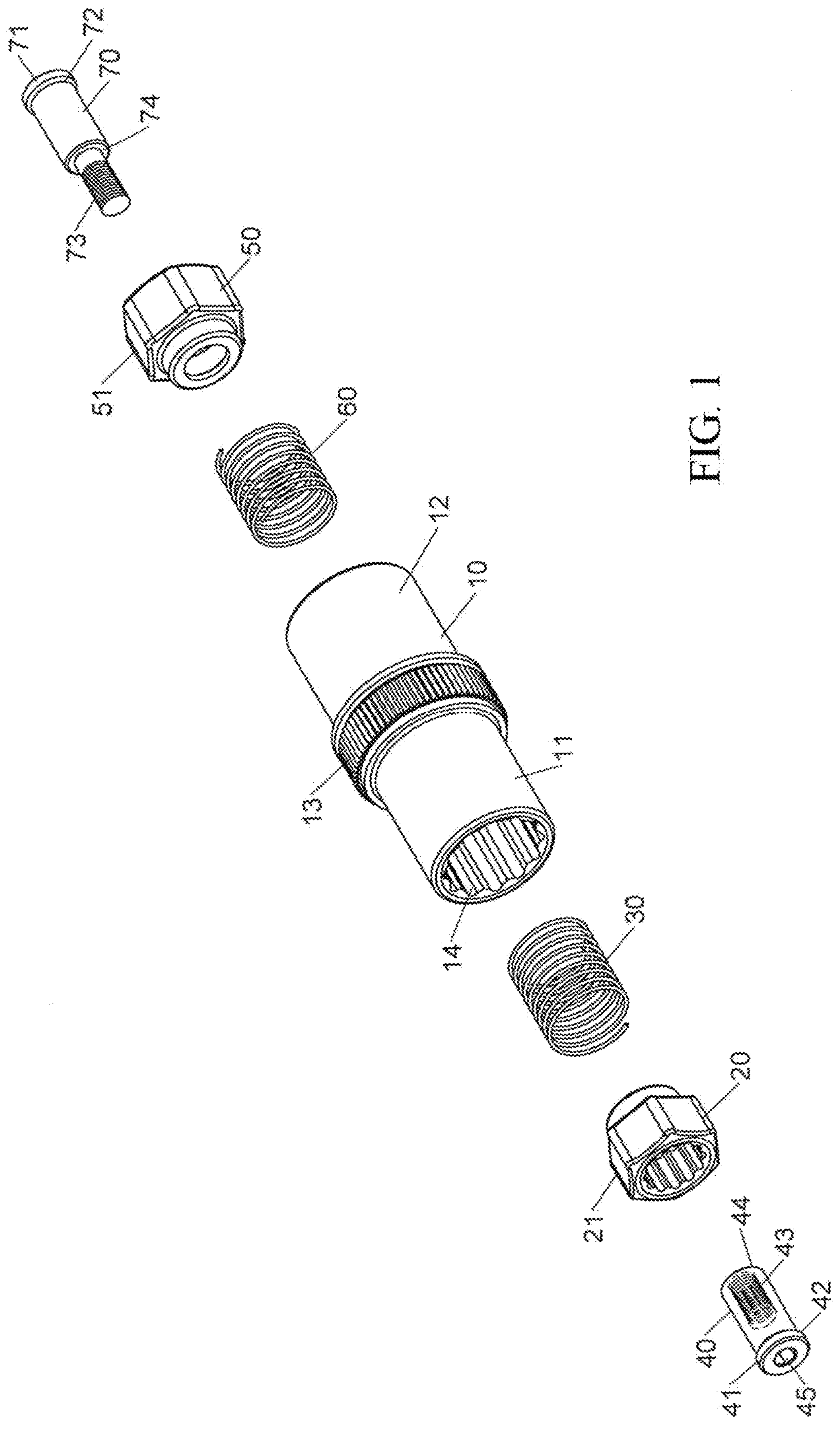
FIG. 1 is an exploded perspective view of a socket structure for a hand operated tool in accordance with the preferred embodiment of the present invention.
Figure 3:
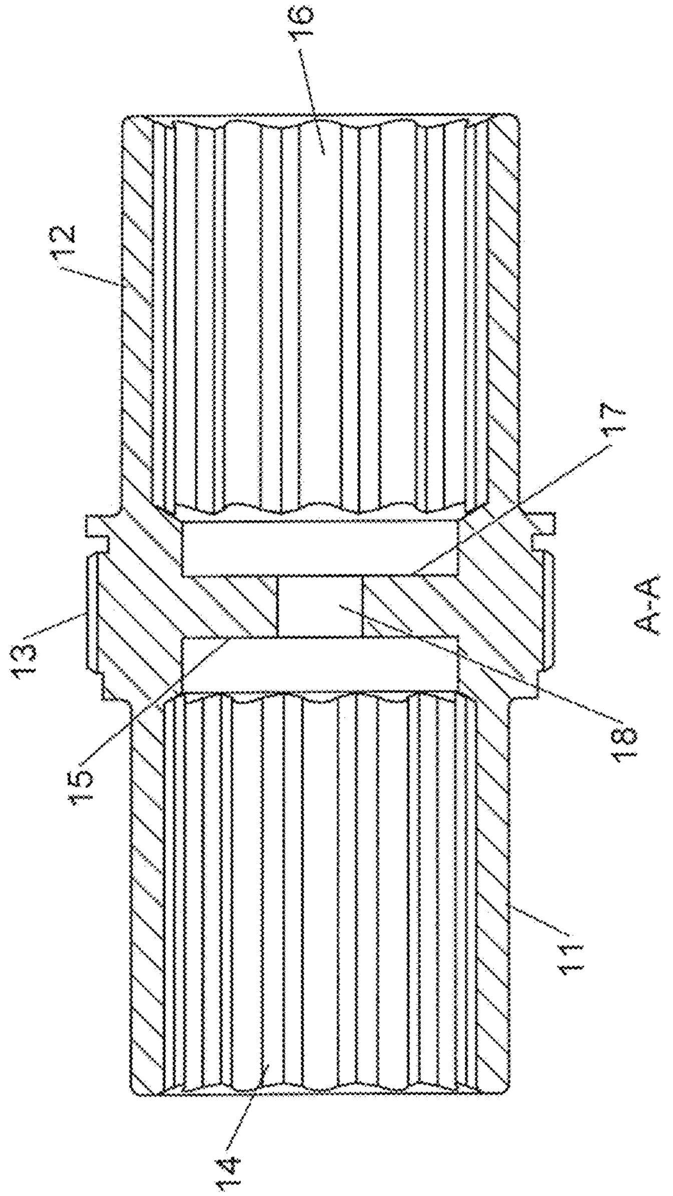
FIG. 3 is a cross-sectional view of the first body taken along line A-A as shown in FIG. 2.
Figure 2:
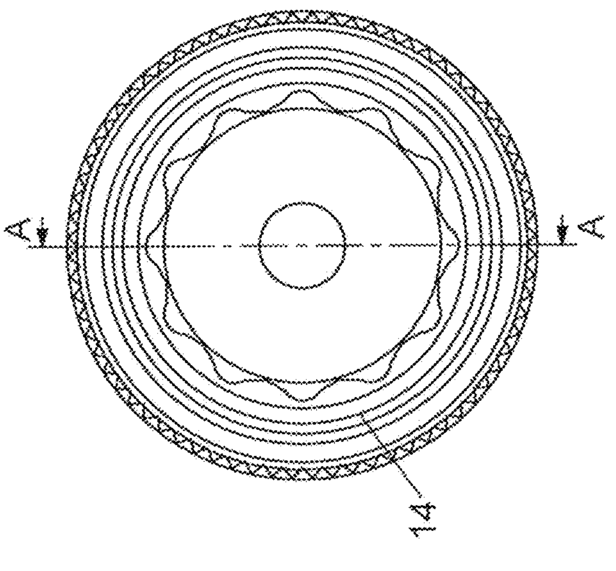
FIG. 2 is a front view of a first body of the socket structure in accordance with the preferred embodiment of the present invention.
Figure 5:
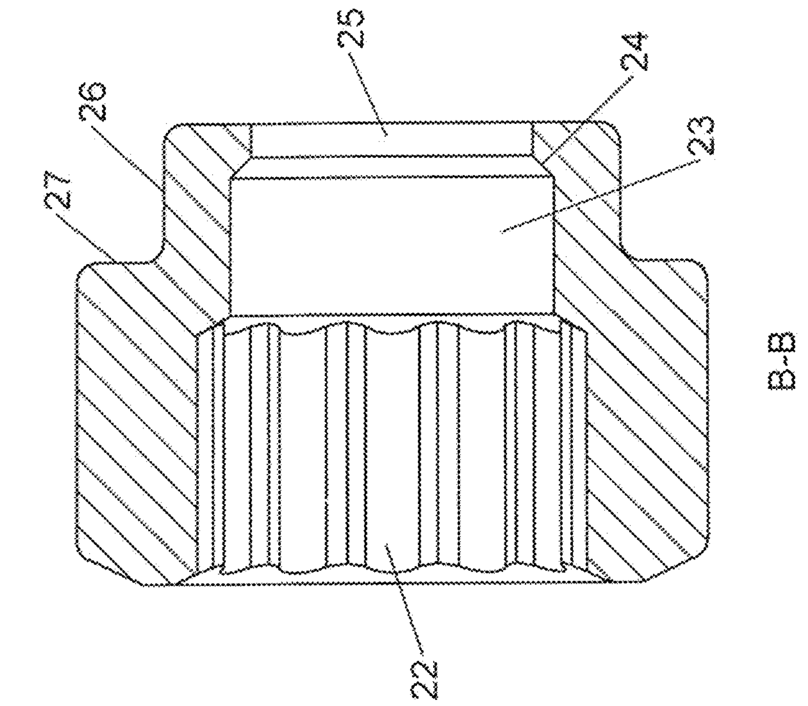
FIG. 5 is a cross-sectional view of the second body taken along line B-B as shown in FIG. 4.
Figure 4:
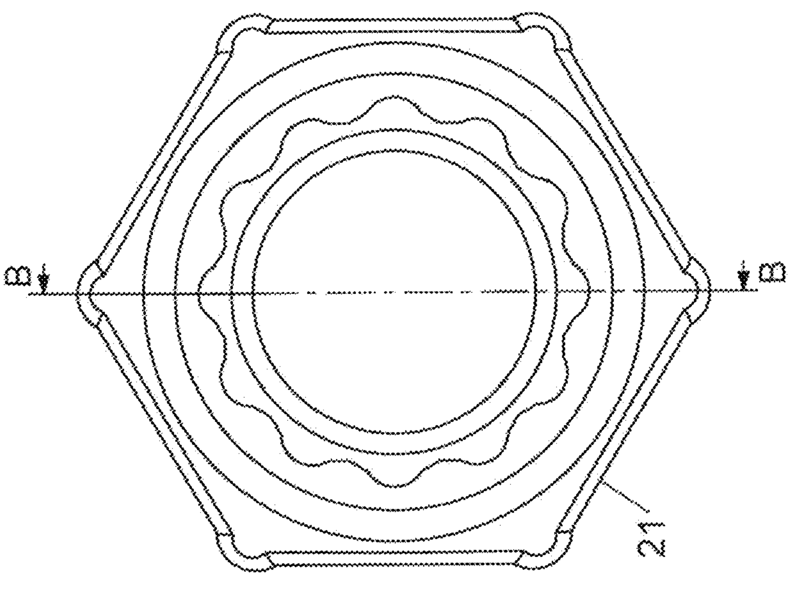
FIG. 4 is a front view of a second body of the socket structure in accordance with the preferred embodiment of the present invention.
Figure 6:
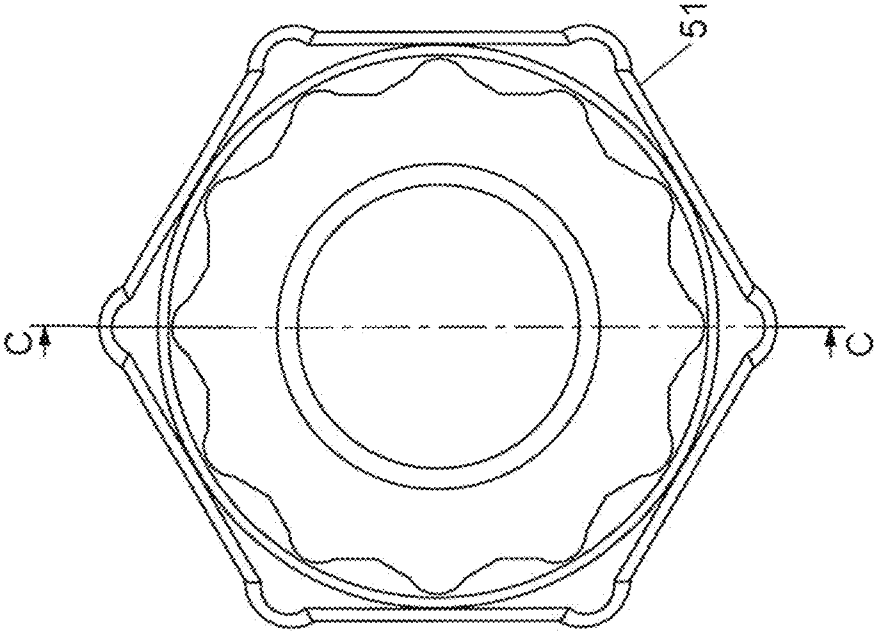
FIG. 6 is a front view of a third body of the socket structure in accordance with the preferred embodiment of the present invention.
Figure 7:
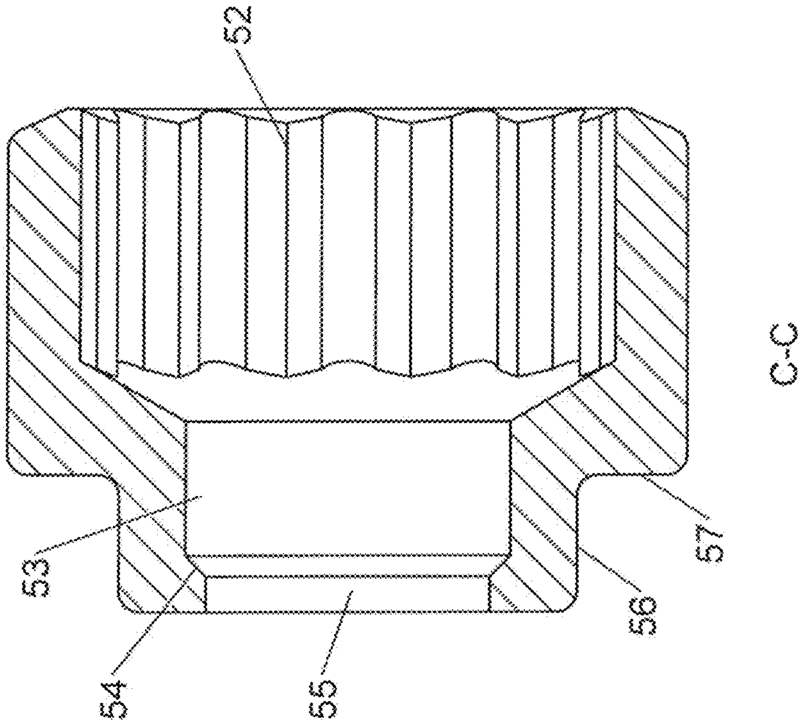
FIG. 7 is a cross-sectional view of the third body taken along line C-C as shown in FIG. 6.
Figure 8:
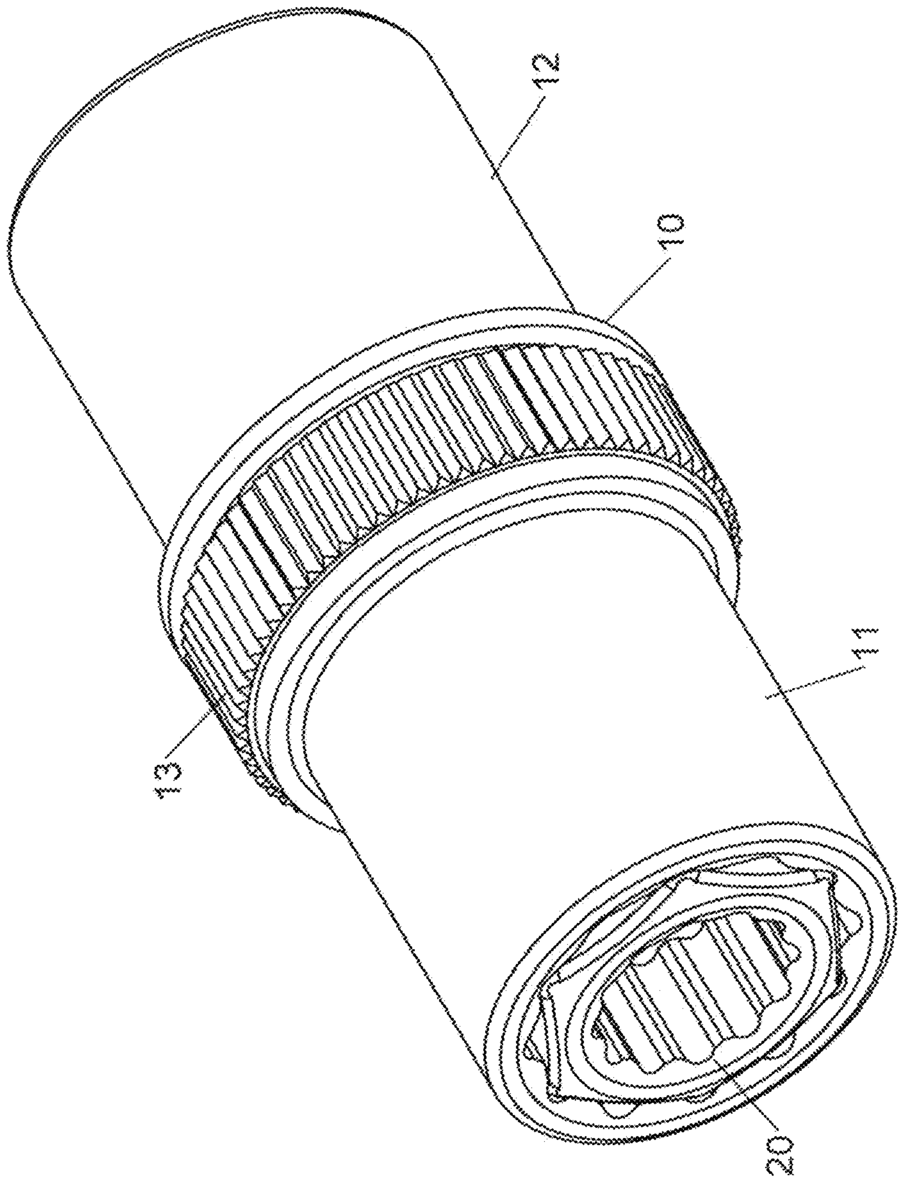
FIG. 8 is a perspective view of the socket structure for a hand operated tool in accordance with the preferred embodiment of the present invention.

Referring to the drawings and initially to FIGS. 1-10, a socket structure for a hand operated tool in accordance with the preferred embodiment of the present invention comprises a first body 10, a second body 20, a first elastic member 30, a first locking member 40, a third body 50, a second elastic member 60, and a second locking member 70.

The first body 10 has a first end 11 and a second end 12 opposite to each other. The first body 10 is provided with a first rotation portion 13. The first rotation portion 13 is located between the first end 11 and the second end 12 and has an annular toothed shape. Preferably, the first body 10 is a ratchet member. The first end 11 has an interior provided with a first mounting portion 14 that is a polygonal recess. The first mounting portion 14 has a bottom provided with a first abutting face 15. The second end 12 has an interior provided with a second mounting portion 16 that is a polygonal recess. The second mounting portion 16 has a bottom provided with a second abutting face 17. The first body 10 is provided with a perforation 18 connected between the first abutting face 15 and the second abutting face 17. The perforation 18 connects the first mounting portion 14 and the second mounting portion 16.

The second body 20 is mounted in the first mounting portion 14 and is movable in the first mounting portion 14. The second body 20 is non-rotatable relative to the first mounting portion 14. The second body 20 has an exterior provided with a first fitting portion 21, a third abutting face 27, and a first mounting end 26. The first fitting portion 21 is a polygonal element mounted in the first mounting portion 14. The third abutting face 27 is located between the first fitting portion 21 and the first mounting end 26. The first mounting end 26 has a diameter less than an inscribed circle diameter of the first fitting portion 21. The second body 20 has an interior provided with a third mounting portion 22, a first receiving groove 23, a first limit portion 24, and a second receiving groove 25. The third mounting portion 22 is a polygonal recess. The first receiving groove 23 is located between the third mounting portion 22 and the first limit portion 24. The first receiving groove 23 has a diameter less than an inscribed circle diameter of the third mounting portion 22. The first limit portion 24 is located between the first receiving groove 23 and the second receiving groove 25. The first limit portion 24 is an inclined face. The second receiving groove 25 is connected to the first limit portion 24, the first receiving groove 23, and the third mounting portion 22. The second receiving groove 25 has the minimum diameter.

The first elastic member 30 is received in the first mounting portion 14 and mounted on the first mounting end 26. The first elastic member 30 is elastically biased between the first abutting face 15 and the third abutting face 27 and provides a restoring force to the second body 20.

Figure 10:
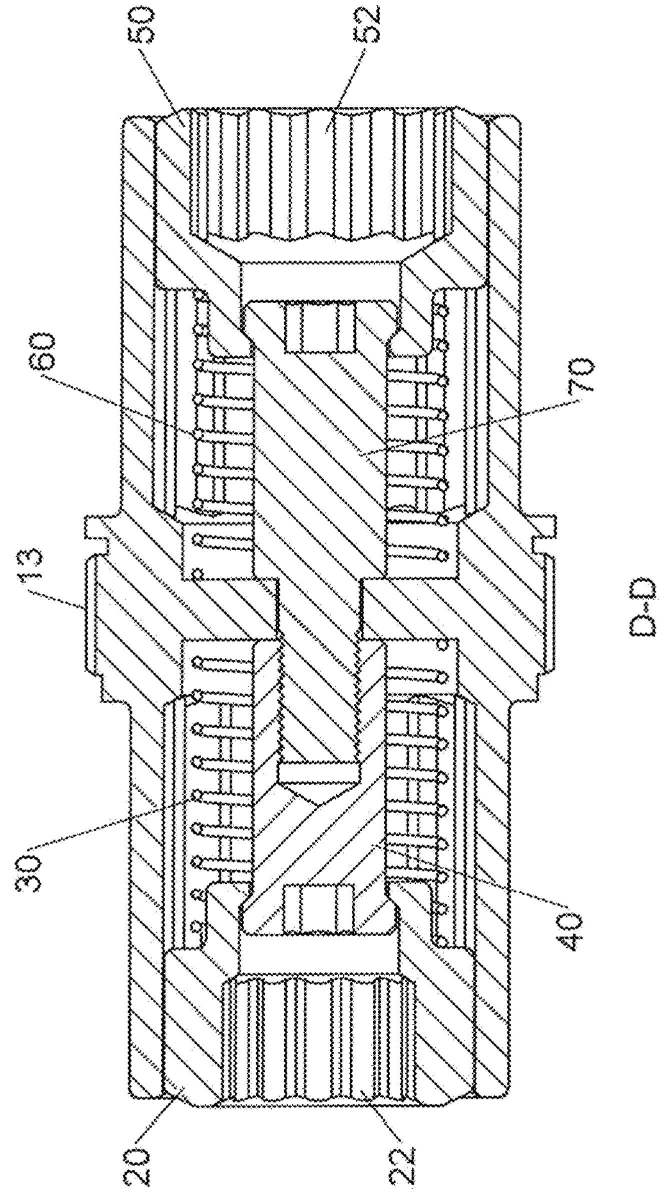
FIG. 10 is a cross-sectional view of the socket structure taken along line D-D as shown in FIG. 9.

The second body 20 is driven by the restoring force of the first elastic member 30 to approach an opening of the first end 11 or slightly protrudes from the first end 11 as shown in FIG. 10.

The first locking member 40 extends through the first body 10 and the second body 20 and is mounted on the first body 10. The first locking member 40 has a first end provided with a first end portion 41 received in the first receiving groove 23. The first locking member 40 is provided with a second limit portion 42 abutting the first limit portion 24, to prevent the second body 20 from being detached from the first mounting portion 14. The second limit portion 42 is formed on a side of the first end portion 41. The second limit portion 42 is an inclined face. The first locking member 40 has a second end having an axis provided with a first screw portion 43 that is a screw hole or an internal thread. The second end of the first locking member 40 is provided with a fourth abutting face 44 abutting the first abutting face 15. The first locking member 40 is provided with a second rotation portion 45 that is a polygonal recess. The second rotation portion 45 is formed in the first end portion 41.

The third body 50 is mounted in second mounting portion 16 and is movable in the second mounting portion 16. The third body 50 is non-rotatable relative to the second mounting portion 16. The third body 50 has an exterior provided with a second fitting portion 51, a fifth abutting face 57, and a second mounting end 56. The second fitting portion 51 is a polygonal element mounted in the second mounting portion 16. The fifth abutting face 57 is located between the second fitting portion 51 and the second mounting end 56. The second mounting end 56 has a diameter less than an inscribed circle diameter of the second fitting portion 51. The third body 50 has an interior provided with a fourth mounting portion 52, a third receiving groove 53, a third limit portion 54, and a fourth receiving groove 55. The fourth mounting portion 52 is a polygonal recess. The third receiving groove 53 is located between the fourth mounting portion 52 and the third limit portion 54. The third receiving groove 53 has a diameter less than an inscribed circle diameter of the fourth mounting portion 52. The third limit portion 54 is located between the third receiving groove 53 and the fourth receiving groove 55. The third limit portion 54 is an inclined face. The fourth receiving groove 55 is connected to the third limit portion 54, the third receiving groove 53, and the fourth mounting portion 52. The fourth receiving groove 55 has the minimum diameter.

The second mounting portion 16 has a specification different from that of the first mounting portion 14. The third mounting portion 22 has a specification different from that of the first mounting portion 14 and the second mounting portion 16. The first mounting portion 14, the second mounting portion 16, the third mounting portion 22, and the fourth mounting portion 52 have different specifications.

The second elastic member 60 is received in the second mounting portion 16 and mounted on the second mounting end 56. The second elastic member 60 is elastically biased between the second abutting face 17 and the fifth abutting face 57 and provides a restoring force to the third body 50.

The third body 50 is driven by the restoring force of second elastic member 60 to approach an opening of the second end 12 or slightly protrudes from the second end 12 as shown in FIG. 10.

The second locking member 70 extends through the third body 50 and the first body 10. The second locking member 70 has a first end provided with a second end portion 71 received in the third receiving groove 53. The second end portion 71 has a maximum diameter of the second locking member 70. The second locking member 70 is provided with a fourth limit portion 72 abutting the third limit portion 54, to prevent the third body 50 from being detached from the second mounting portion 16. The fourth limit portion 72 is formed on a side of the second end portion 71. The fourth limit portion 72 is an inclined face. The second locking member 70 has a second end provided with a second screw portion 73 that is a threaded rod or an external thread. The second screw portion 73 extends through the perforation 18 and is screwed into the first screw portion 43. The second end of the second locking member 70 is provided with a sixth abutting face 74 abutting the second abutting face 17.

The first locking member 40 is screwed with the second locking member 70. The first locking member 40 and the second locking member 70 retain the second body 20 and the third body 50 in the first body 10.

Figure 9:
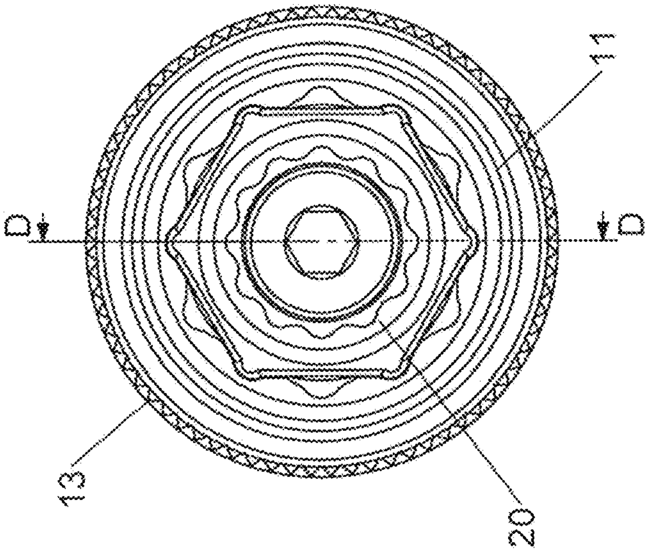
FIG. 9 is a front view of the socket structure as shown in FIG. 8.

Referring to FIGS. 9 and 10 with reference to FIGS. 1-8, the second body 20 is mounted in the first mounting portion 14, the third body 50 is mounted in the second mounting portion 16, the first locking member 40 extends through the second body 20 and the first body 10, the second locking member 70 extends through the third body 50 and the first body 10, and the second screw portion 73 of the second locking member 70 extends through the perforation 18 of the first body 10 and is screwed into the first screw portion 43 of the first locking member 40, to assemble the first body 10, the second body 20, and the third body 50. Thus, the socket structure includes the first mounting portion 14, the second mounting portion 16, the third mounting portion 22, and the fourth mounting portion 52 with four different specifications.

Figure 11:
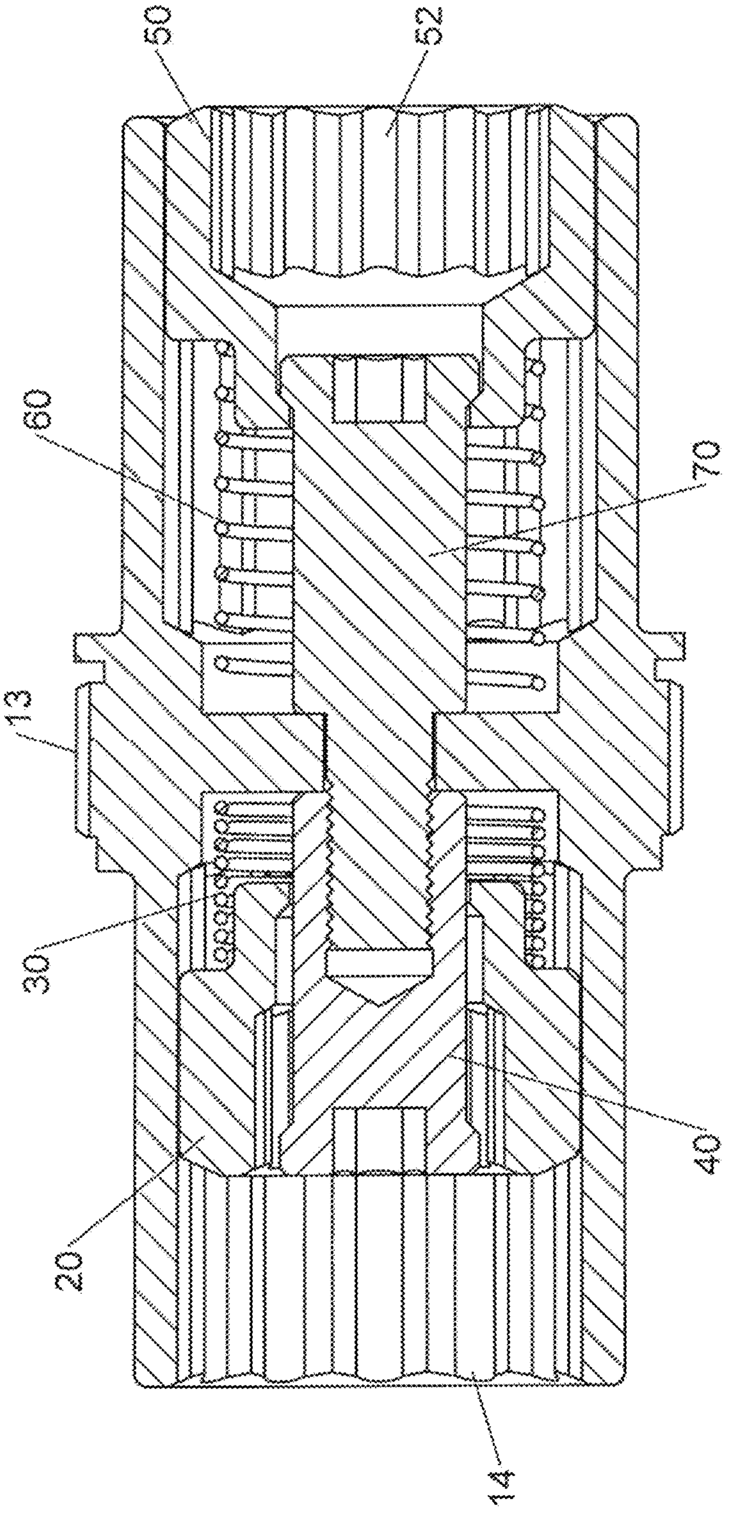
FIG. 11 is a schematic operational view of the socket structure as shown in FIG. 10.

Referring to FIG. 11 with reference to FIGS. 1-10, when a first tool is inserted into the first mounting portion 14, the second body 20 is pushed by the first tool, and the first elastic member 30 is compressed by the second body 20, so that the first mounting portion 14 is exposed from the second body 20.

Figure 12:
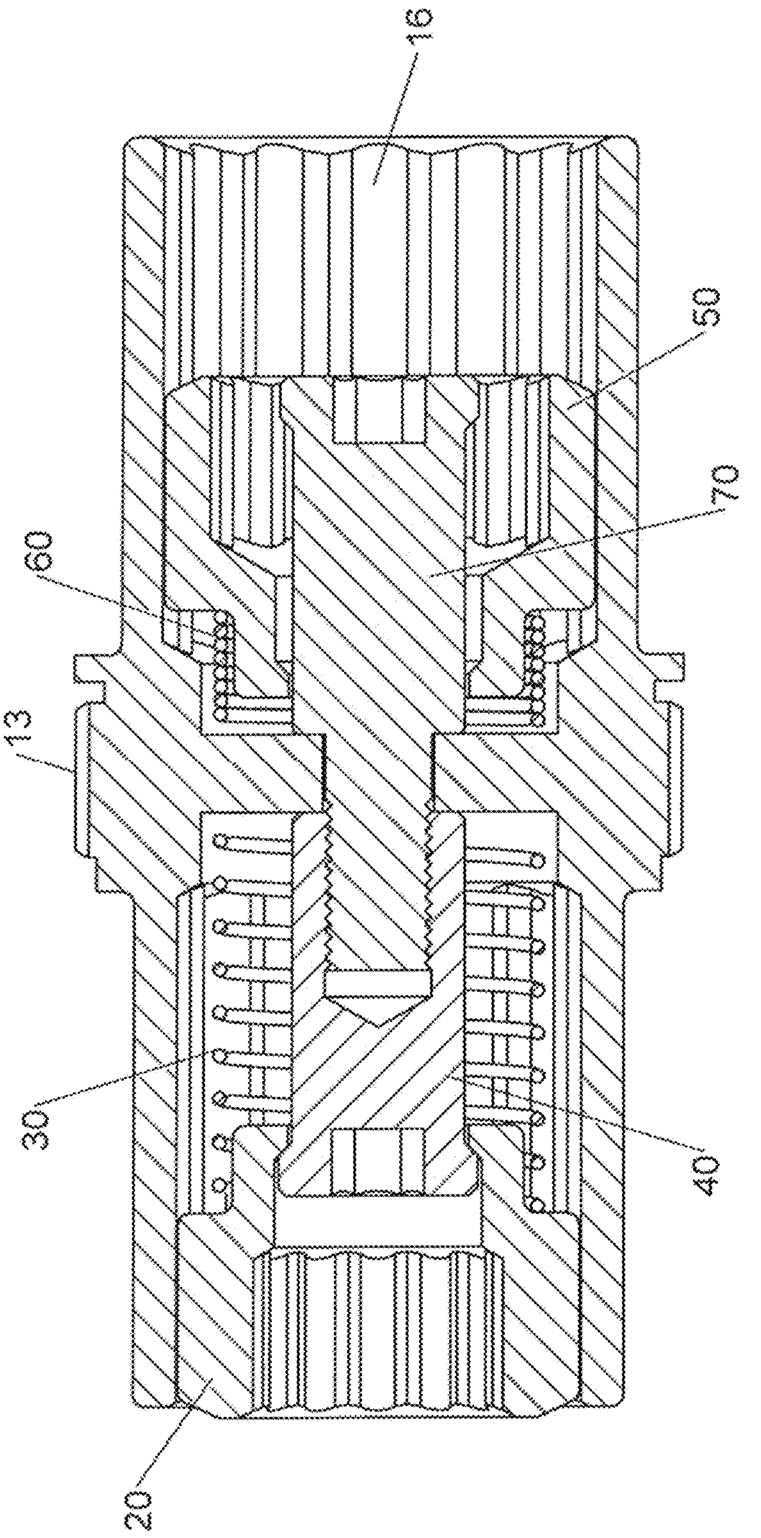
FIG. 12 is a schematic operational view of the socket structure as shown in FIG. 10.

Referring to FIG. 12 with reference to FIGS. 1-10, when a second tool is inserted into the second mounting portion 16, the third body 50 is pushed by the second tool, and the second elastic member 60 is compressed by the third body 50, so that the second mounting portion 16 is exposed from the third body 50.

Figure 13:
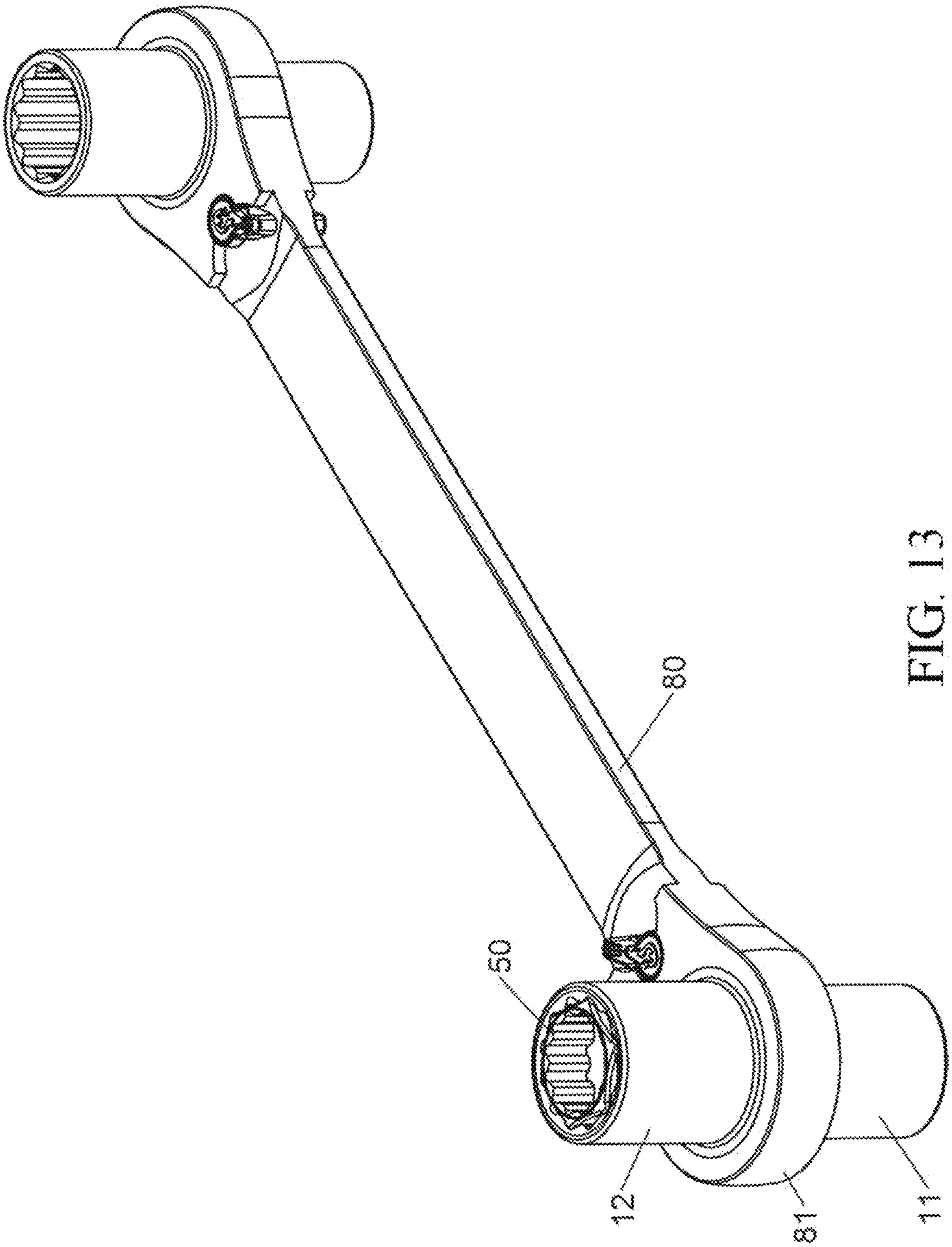
FIG. 13 is a perspective view of a socket structure for a hand operated tool in accordance with the second preferred embodiment of the present invention.

Referring to FIG. 13 with reference to FIGS. 1-10, the socket structure further comprises a wrench 80 having two operation (or action) ends 81. The first body 10, the second body 20, the first elastic member 30, the first locking member 40, the third body 50, the second elastic member 60, and the second locking member 70 are mounted on one of the two operation ends 81 of the wrench 80, so that the wrench 80 includes the first mounting portion 14, the second mounting portion 16, the third mounting portion 22, and the fourth mounting portion 52 of four different sizes and specifications for rotating screw members. Alternatively, the first body 10, the second body 20, the first elastic member 30, the first locking member 40, the third body 50, the second elastic member 60, and the second locking member 70 are mounted on each of the two operation ends 81 of the wrench 80, so that the wrench 80 includes the first mounting portion 14, the second mounting portion 16, the third mounting portion 22, and the fourth mounting portion 52 of eight different sizes and specifications for rotating screw members.

Figure 14:
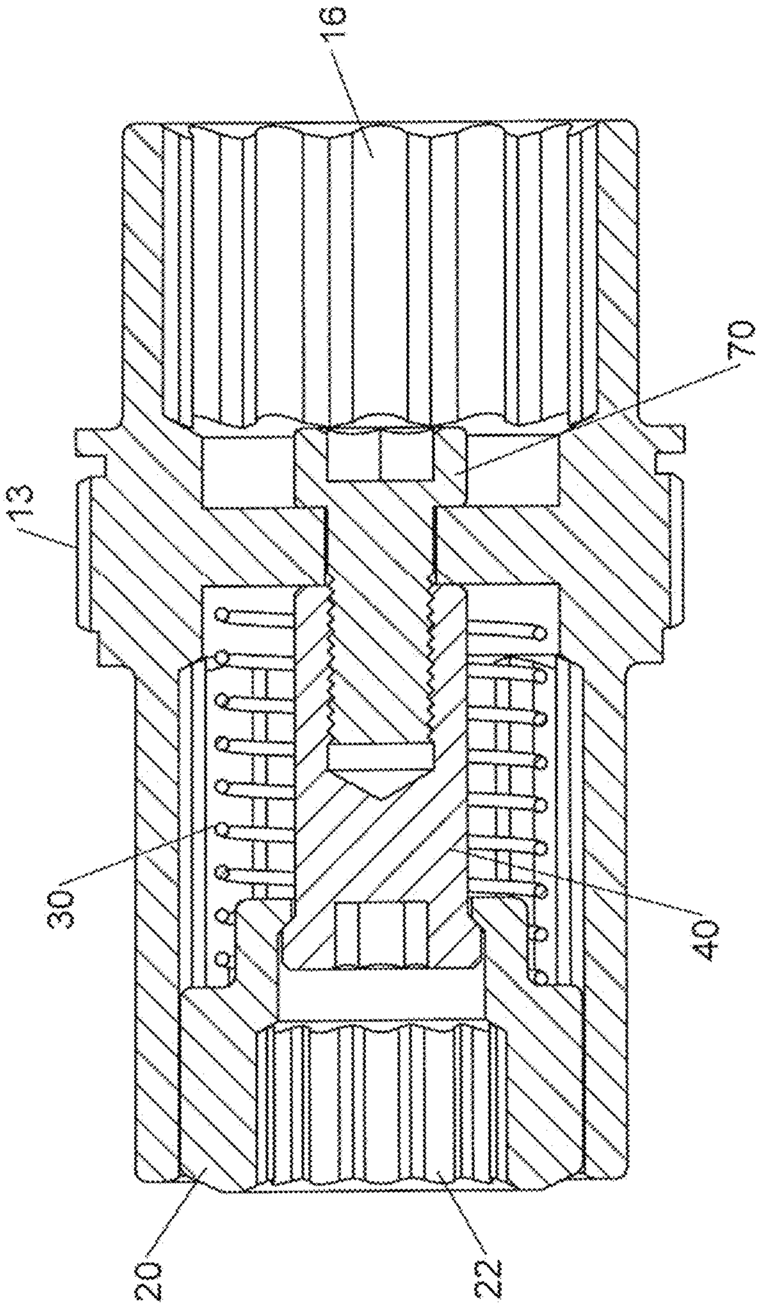
FIG. 14 is a cross-sectional view of a socket structure for a hand operated tool in accordance with the third preferred embodiment of the present invention.

Referring to FIG. 14 with reference to FIGS. 1-10, the third body 50 is undefined, and the second locking member 70 extends through the second mounting portion 16 and the perforation 18, and is screwed into the first locking member 40. Thus, the socket structure only includes the first mounting portion 14, the second mounting portion 16, and the third mounting portion 22 with three different sizes and specifications.

Figure 15:
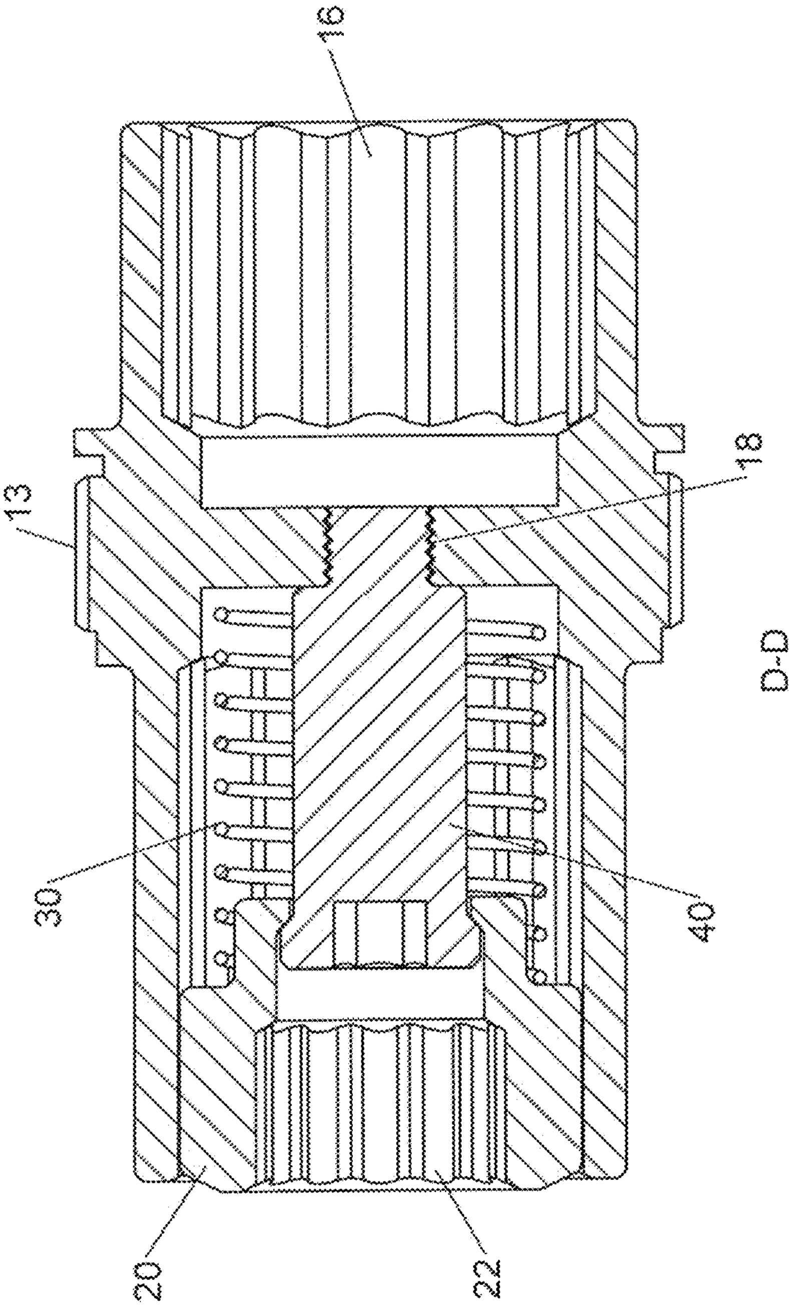
FIG. 15 is a cross-sectional view of a socket structure for a hand operated tool in accordance with the fourth preferred embodiment of the present invention.

Referring to FIG. 15 with reference to FIGS. 1-10, the third body 50 and the second locking member 70 are undefined, the perforation 18 is a screw hole, and the first locking member 40 extends through the second body 20 and is screwed into the perforation 18. Thus, the socket structure only includes the first mounting portion 14, the second mounting portion 16, and the third mounting portion 22 with three different sizes and specifications.

Figure 16:
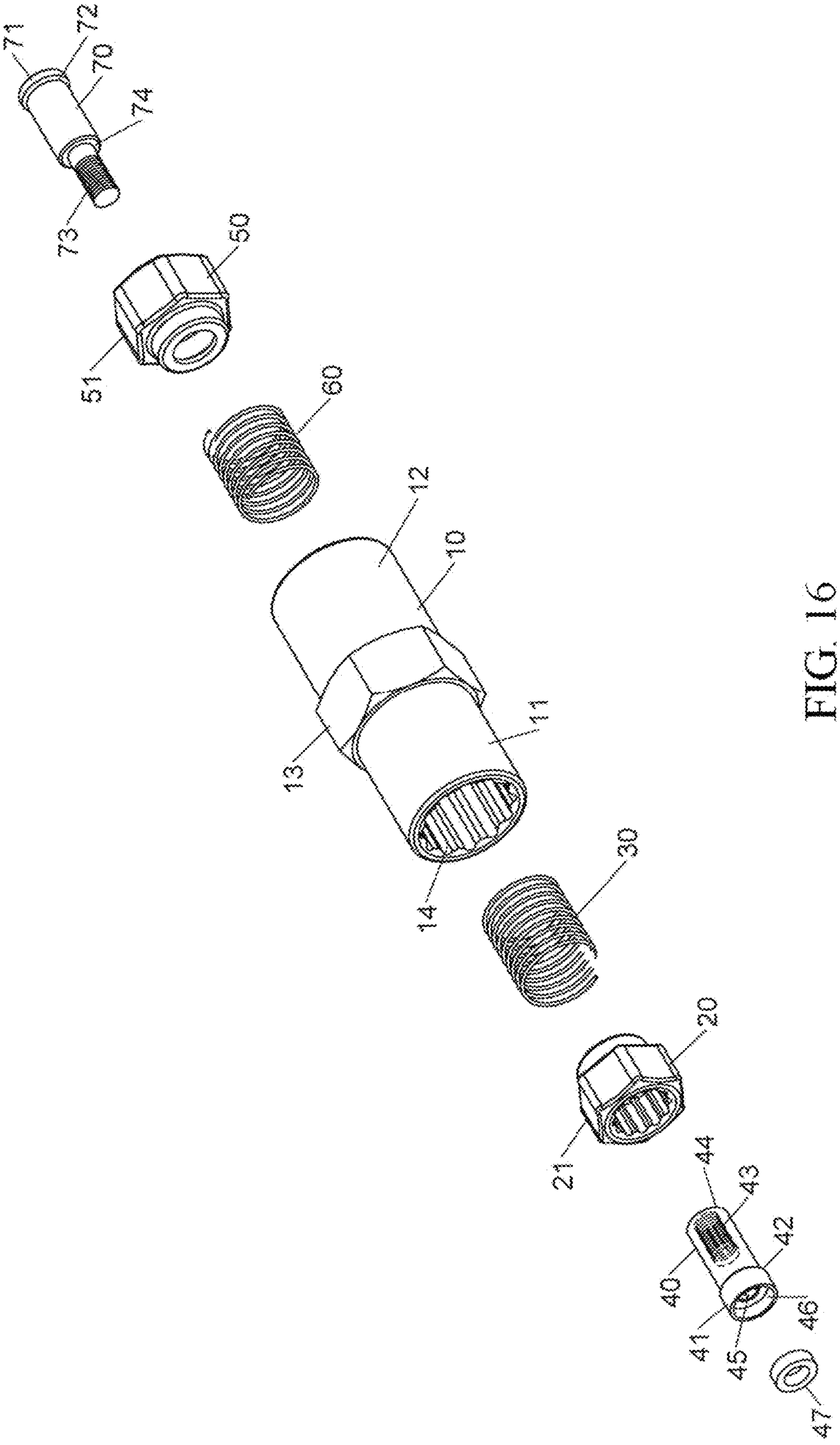
FIG. 16 is an exploded perspective view of a socket structure for a hand operated tool in accordance with the fifth preferred embodiment of the present invention.

Referring to FIG. 16 with reference to FIGS. 1-10, the first rotation portion 13 is a hexagonal projection. The first locking member 40 is provided with a fifth receiving groove 46 connected to the second rotation portion 45. The fifth receiving groove 46 has a circular shape. The socket structure further comprises a magnetic member 47 mounted in the fifth receiving groove 46 so that the first locking member 40 has a magnetically attractive effect. The magnetic member 47 has a ring shape.

Figure 17:
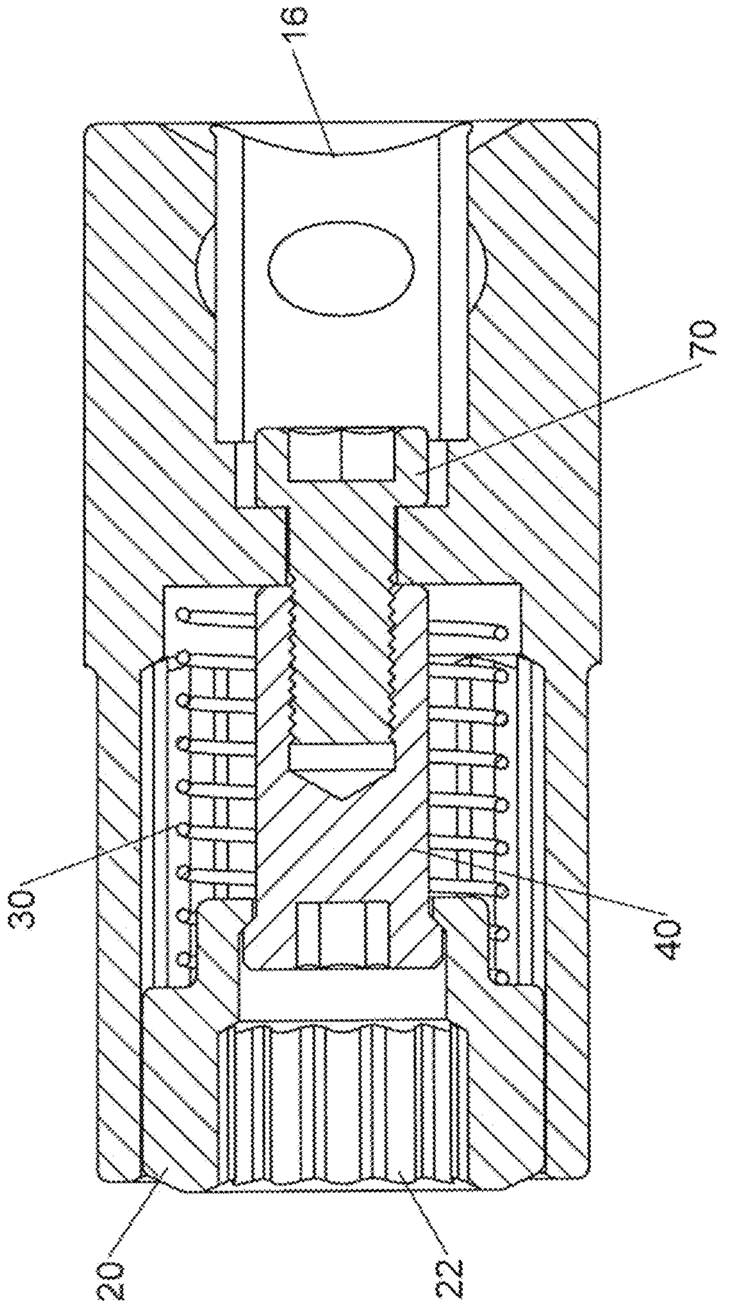
FIG. 17 is a cross-sectional view of a socket structure for a hand operated tool in accordance with the sixth preferred embodiment of the present invention.

Referring to FIG. 17 with reference to FIGS. 1-10, the second mounting portion 16 is a square or tetragonal recess, and the first body 10 is a socket.

Referring to FIGS. 18-21 with reference to FIGS. 1-10, the socket structure further comprises a fourth body 91, a first snap ring 92, a fifth body 93, and a second snap ring 94.

The first end 11 has a non-circular shape and is provided with two fifth limit portions 19 spaced from each other. Each of the two fifth limit portions 19 is an annularly arranged groove. The second end 12 has a non-circular shape and is provided with two sixth limit portions 191 spaced from each other. Each of the two sixth limit portions 191 is an annularly arranged groove.

The fourth body 91 is mounted on the first end 11 and provided with a fifth mounting portion 911 mounted on the first end 11. The fifth mounting portion 911 is a polygonal recess. The fourth body 91 is provided with a first snap ring groove (or retaining groove) 912 formed in the fifth mounting portion 911. The first snap ring groove 912 has an annular shape.

Figure 21:
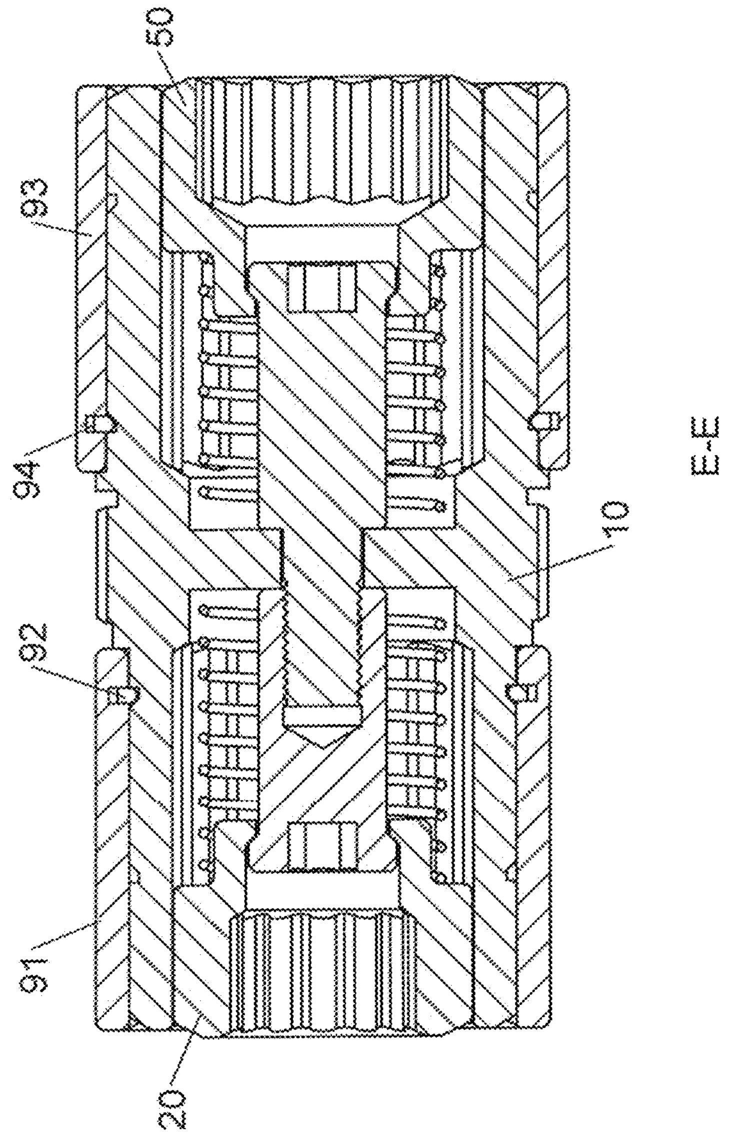
FIG. 21 is a cross-sectional view of the socket structure taken along line E-E as shown in FIG. 20.

The first snap ring 92 is a C-shaped elastic element. The first snap ring 92 is received (or retained) in the first snap ring groove 912 and mounted on the first end 11. The fourth body 91 is movable on the first end 11 so that the first snap ring 92 is locked on one of the two fifth limit portions 19 as shown in FIG. 21, and the fourth body 91 is positioned on two positions. When the fourth body 91 is moved to protrude from the first body 10 partially, the fifth mounting portion 911 is exposed to rotate a screw member of a different specification.

The fifth body 93 is mounted on the second end 12 and provided with a sixth mounting portion 931 mounted on the second end 12. The sixth mounting portion 931 is a polygonal recess. The fifth body 93 is provided with a second snap ring groove (or retaining groove) 932 formed in the sixth mounting portion 931. The second snap ring groove 932 has an annular shape.

The second snap ring 94 is a C-shaped elastic element. The second snap ring 94 is received (or retained) in the second snap ring groove 932 and mounted on the second end 12. The fifth body 93 is movable on the second end 12 so that the second snap ring 94 is locked on one of the two sixth limit portions 191 as shown in FIG. 21, and the fifth body 93 is positioned on two positions. When the fifth body 93 is moved to protrude from the first body 10 partially, the sixth mounting portion 931 is exposed to rotate a screw member of a different specification.

Figure 18:
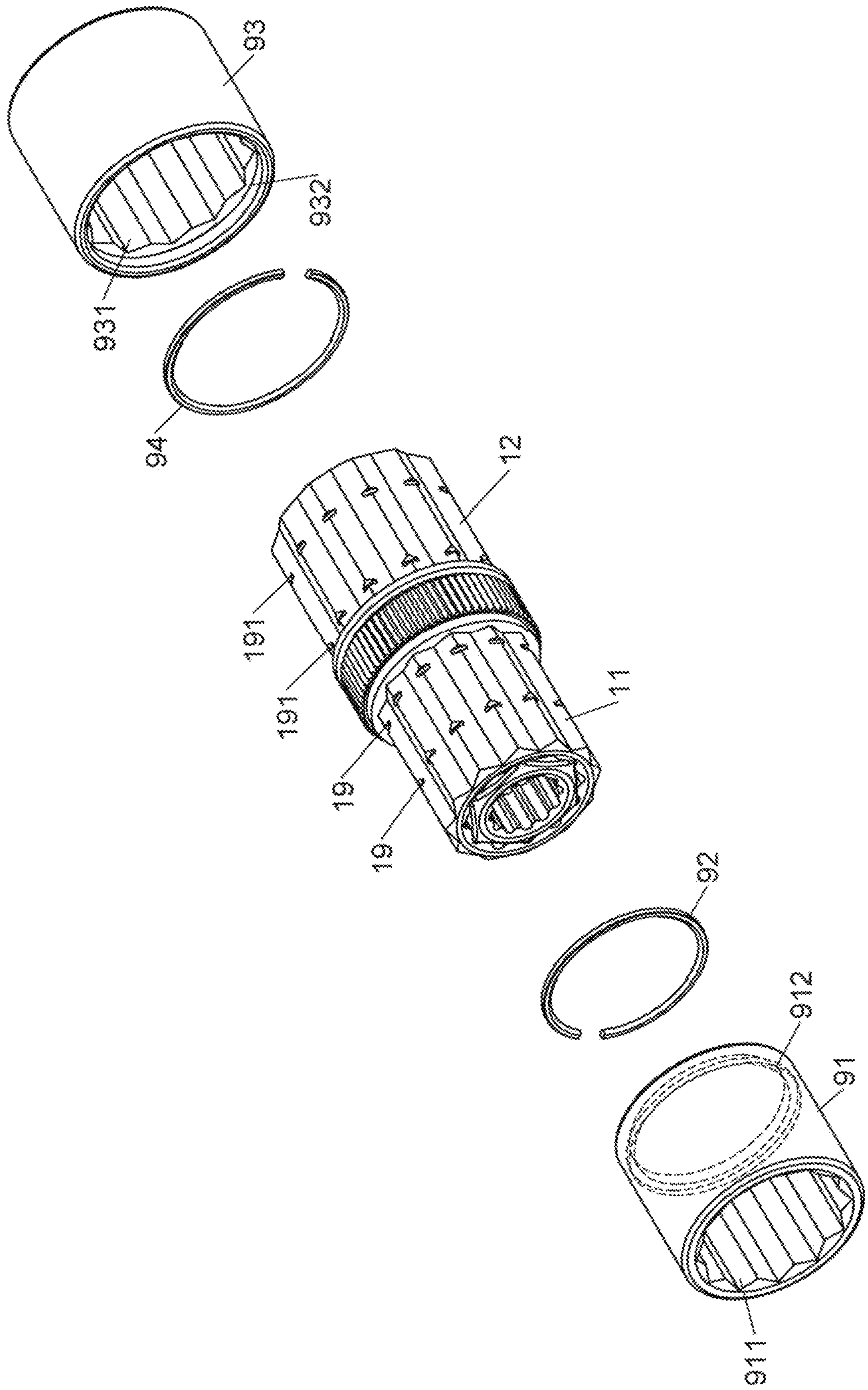
FIG. 18 is an exploded perspective view of a socket structure for a hand operated tool in accordance with the seventh preferred embodiment of the present invention.
Figure 19:
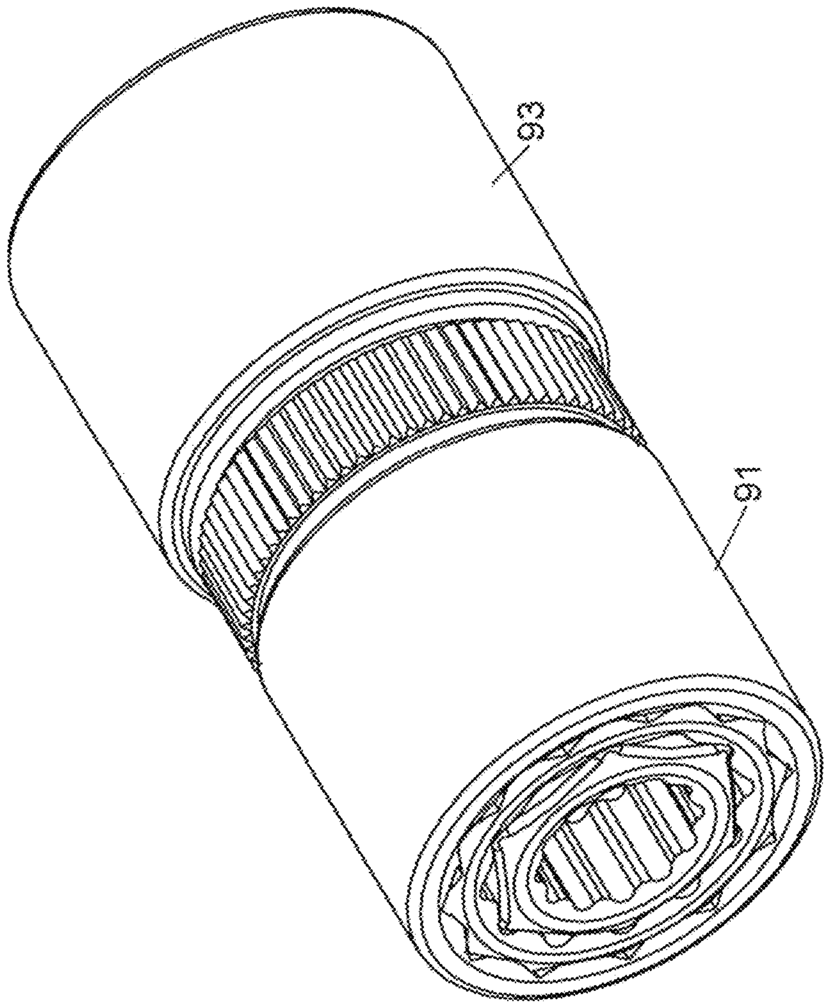
FIG. 19 is a perspective assembly view of the socket structure as shown in FIG. 18.
Figure 20:
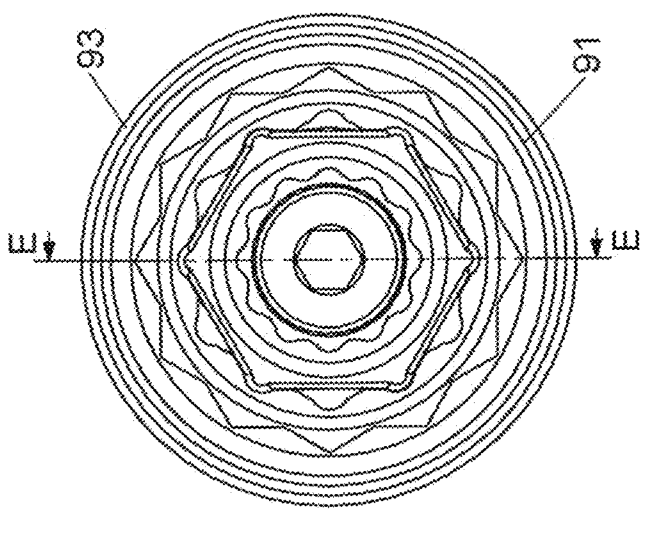
FIG. 20 is a front view of the socket structure as shown in FIG. 19.
Figure 22:
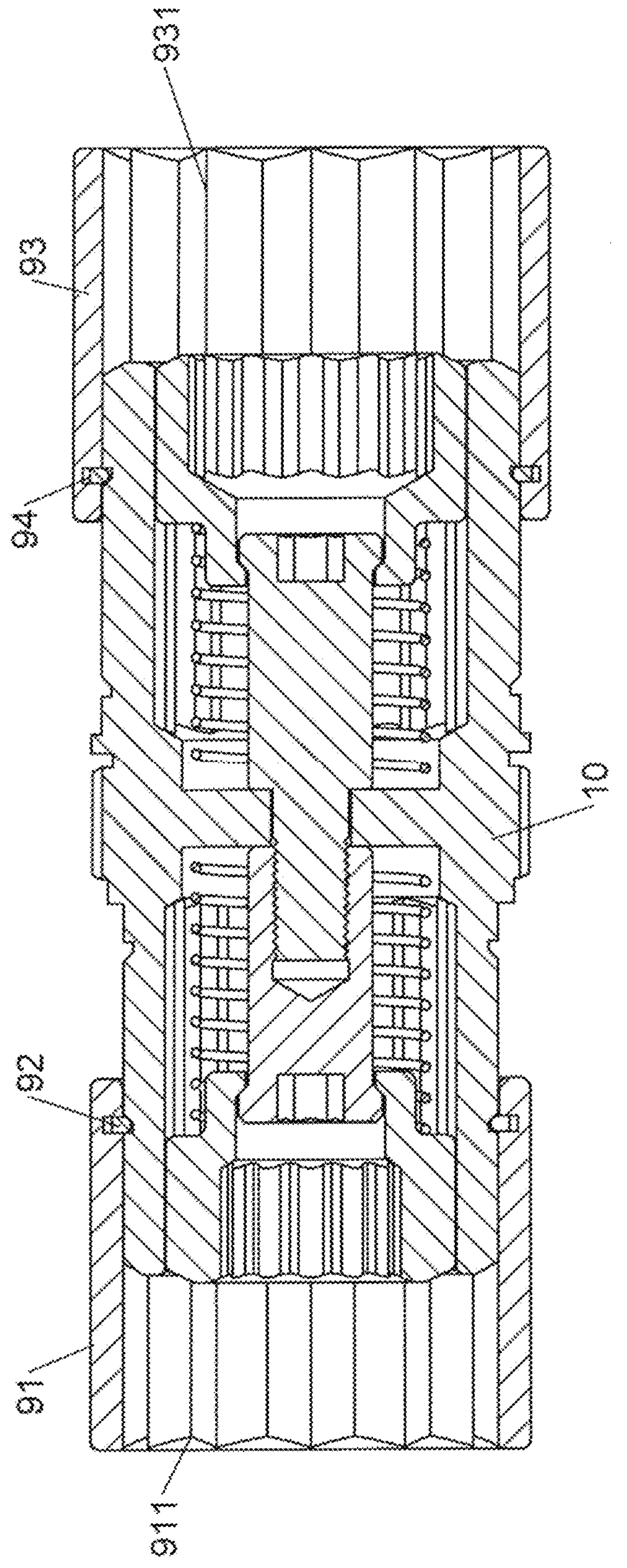
FIG. 22 is a schematic operational view of the socket structure as shown in FIG. 21.

In operation, referring to FIGS. 21 and 22 with reference to FIGS. 18-20, when the fourth body 91 is movable on the first end 11, the first snap ring 92 is unlocked from one of the two fifth limit portions 19 and locked on the other one of the two fifth limit portions 19 as shown in FIG. 22, so that the fifth mounting portion 911 is exposed for mounting the screw member of a different specification. Similarly, when the fifth body 93 is movable on the second end 12, the second snap ring 94 is unlocked from one of the two sixth limit portions 191 and locked on the other one of the two sixth limit portions 191 as shown in FIG. 22, so that the sixth mounting portion 931 is exposed for mounting the screw member of a different specification. Thus, the socket structure includes the first mounting portion 14, the second mounting portion 16, the third mounting portion 22, the fourth mounting portion 52, the fifth mounting portion 911, and the sixth mounting portion 931 with six different specifications.

Accordingly, the socket structure for a hand operated tool in accordance with the present invention has the following advantages.

1. The first body 10 is provided with the first mounting portion 14 and the second mounting portion 16. The second body 20 is mounted in the first mounting portion 14 and is provided with the third mounting portion 22. The first mounting portion 14, the second mounting portion 16, and the third mounting portion 22 have different specifications, so that the socket structure is adapted to drive and rotate tools of three different specifications.
2. The first locking member 40 extends through the second body 20 and is assembled with the first body 10, so that the second body 20 is assembled in the first body 10, thereby simplifying assembly of the second body 20 and the first body 10.
3. The first locking member 40 is provided with the second limit portion 42 abutting the first limit portion 24, to prevent the second body 20 from being detached from the first mounting portion 14, so that the first locking member 40 directly restricts the second body 20 during assembly.
4. The socket structure primarily comprises the first body 10, the second body 20, the first elastic member 30, and the first locking member 40, so that the socket structure has simple parts.
5. The first body 10 is provided with the first mounting portion 14 and the second mounting portion 16. The second body 20 and the third body 50 are mounted in the first body 10. The second body 20 is provided with the third mounting portion 22. The third body 50 is provided with the fourth mounting portion 52. Thus, the socket structure includes the first mounting portion 14, the second mounting portion 16, the third mounting portion 22, and the fourth mounting portion 52 of four different sizes and specifications.
6. The first locking member 40 extends through the second body 20, the second locking member 70 extends through the third body 50 and the first body 10, and the second screw portion 73 of the second locking member 70 extends through the perforation 18 of the first body 10 and is screwed into the first screw portion 43 of the first locking member 40, so that the second body 20 is assembled in the first body 10, and the third body 50 is assembled in the first body 10. Thus, the socket structure is assembled simply.
7. The first locking member 40 is provided with the second limit portion 42 abutting the first limit portion 24, to prevent the second body 20 from being detached from the first mounting portion 14, and the second locking member 70 is provided with the fourth limit portion 72 abutting the third limit portion 54, to prevent the third body 50 from being detached from the second mounting portion 16, so that the first locking member 40 and the second locking member 70 have a restricting function.
8. The socket structure only comprises the first body 10, the second body 20, the first elastic member 30, the first locking member 40, the third body 50, the second elastic member 60, and the second locking member 70, so that the socket structure has simplified parts with four different specifications.
9. The second body 20, the first elastic member 30, the third body 50, and the second elastic member 60 are removed after the first locking member 40 and the second locking member 70 are disassembled, thereby facilitating replacement of the parts.
10. The fourth body 91 and the fifth body 93 are added and mounted on the first body 10 so that the socket structure includes mounting portions of six different specifications.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A socket structure comprising:

a first body, a second body, a first elastic member, a first locking member, a third body, a second elastic member, and a second locking member;

wherein:

the first body has a first end and a second end opposite to each other;

the first body is provided with a first rotation portion;

the first end has an interior provided with a first mounting portion that is a polygonal recess;

the first mounting portion has a bottom provided with a first abutting face;

the second end has an interior provided with a second mounting portion that is a polygonal recess;

the second mounting portion has a bottom provided with a second abutting face;

the first body is provided with a perforation connected between the first abutting face and the second abutting face;

the perforation connects the first mounting portion and the second mounting portion;

the second body is mounted in the first mounting portion and is movable in the first mounting portion;

the second body is non-rotatable relative to the first mounting portion;

the second body has an exterior provided with a first fitting portion, a third abutting face, and a first mounting end;

the first fitting portion is a polygonal element mounted in the first mounting portion;

the third abutting face is located between the first fitting portion and the first mounting end;
the first mounting end has a diameter less than an inscribed circle diameter of the first fitting portion;
the second body has an interior provided with a third mounting portion, a first receiving groove, a first limit portion, and a second receiving groove;
the third mounting portion is a polygonal recess;
the first receiving groove is located between the third mounting portion and the first limit portion;
the first receiving groove has a diameter less than an inscribed circle diameter of the third mounting portion;
the first limit portion is located between the first receiving groove and the second receiving groove;
the second receiving groove is connected to the first limit portion, the first receiving groove, and the third mounting portion;
the second receiving groove has the minimum diameter;
the first elastic member is received in the first mounting portion and mounted on the first mounting end;
the first elastic member is elastically biased between the first abutting face and the third abutting face and provides a restoring force to the second body;
the second body is driven by the restoring force of the first elastic member to approach an opening of the first end or slightly protrudes from the first end;
the first locking member extends through the first body and the second body and is mounted on the first body;
the first locking member has a first end provided with a first end portion received in the first receiving groove;
the first locking member is provided with a second limit portion abutting the first limit portion, to prevent the second body from being detached from the first mounting portion;
the second limit portion is formed on a side of the first end portion;
the first locking member has a second end having an axis provided with a first screw portion that is a screw hole;
the second end of the first locking member is provided with a fourth abutting face abutting the first abutting face;
the first locking member is provided with a second rotation portion that is a polygonal recess;
the second rotation portion is formed in the first end portion;
the third body is mounted in second mounting portion and is movable in the second mounting portion;
the third body is non-rotatable relative to the second mounting portion;
the third body has an exterior provided with a second fitting portion, a fifth abutting face, and a second mounting end;
the second fitting portion is a polygonal element mounted in the second mounting portion;
the fifth abutting face is located between the second fitting portion and the second mounting end;
the second mounting end has a diameter less than an inscribed circle diameter of the second fitting portion;
the third body has an interior provided with a fourth mounting portion, a third receiving groove, a third limit portion, and a fourth receiving groove;
the fourth mounting portion is a polygonal recess;
the third receiving groove is located between the fourth mounting portion and the third limit portion;
the third receiving groove has a diameter less than an inscribed circle diameter of the fourth mounting portion;
the third limit portion is located between the third receiving groove and the fourth receiving groove;
the fourth receiving groove is connected to the third limit portion, the third receiving groove, and the fourth mounting portion;
the fourth receiving groove has the minimum diameter;
the second mounting portion has a specification different from that of the first mounting portion;
the third mounting portion has a specification different from that of the first mounting portion and the second mounting portion;
the first mounting portion, the second mounting portion, the third mounting portion, and the fourth mounting portion have different specifications;
the second elastic member is received in the second mounting portion and mounted on the second mounting end;
the second elastic member is elastically biased between the second abutting face and the fifth abutting face and provides a restoring force to the third body;
the third body is driven by the restoring force of second elastic member to approach an opening of the second end or slightly protrudes from the second end;
the second locking member extends through the third body and the first body;
the second locking member has a first end provided with a second end portion received in the third receiving groove;
the second end portion has a maximum diameter of the second locking member;
the second locking member is provided with a fourth limit portion abutting the third limit portion, to prevent the third body from being detached from the second mounting portion;
the fourth limit portion is formed on a side of the second end portion;
the second locking member has a second end provided with a second screw portion that is a threaded rod;
the second screw portion extends through the perforation and is screwed into the first screw portion;
the second end of the second locking member is provided with a sixth abutting face abutting the second abutting face;
the first locking member is screwed with the second locking member; and
the first locking member and the second locking member retain the second body and the third body in the first body.

2. The socket structure as claimed in claim 1, wherein the first rotation portion is located between the first end and the second end and has an annular toothed shape, and the first body is a ratchet member.

3. The socket structure as claimed in claim 1, wherein the first limit portion is an inclined face.

4. The socket structure as claimed in claim 1, wherein the second limit portion is an inclined face.

5. The socket structure as claimed in claim 1, wherein the third limit portion is an inclined face, and the fourth limit portion is an inclined face.

6. The socket structure as claimed in claim 1, further comprising:
a wrench having two operation ends;
wherein:
the first body, the second body, the first elastic member, the first locking member, the third body, the second elastic member, and the second locking member are mounted on one of the two operation ends of the wrench, so that the wrench includes the first mounting portion, the second mounting portion, the third mounting portion, and the fourth mounting portion of four different sizes and specifications; or the first body, the second body, the first elastic member, the first locking member, the third body, the second elastic member, and the second locking member are mounted on each of the two operation ends of the wrench, so that the wrench includes the first mounting portion, the second mounting portion, the third mounting portion, and the fourth mounting portion of eight different sizes and specifications.

7. The socket structure as claimed in claim 1, wherein the second locking member extends through the second mounting portion and the perforation, and is screwed into the first locking member.

8. The socket structure as claimed in claim 1, wherein the first rotation portion is a hexagonal projection.

9. The socket structure as claimed in claim 1, wherein:

the first locking member is provided with a fifth receiving groove connected to the second rotation portion;

the fifth receiving groove has a circular shape; and the socket structure further comprises a magnetic member mounted in the fifth receiving groove.

10. The socket structure as claimed in claim 1, further comprising:

a fourth body, a first snap ring, a fifth body, and a second snap ring;

wherein:

the first end has a non-circular shape and is provided with two fifth limit portions spaced from each other;

each of the two fifth limit portions is an annularly arranged groove;

the second end has a non-circular shape and is provided with two sixth limit portions spaced from each other;

each of the two sixth limit portions is an annularly arranged groove;

the fourth body is mounted on the first end and provided with a fifth mounting portion mounted on the first end;

the fifth mounting portion is a polygonal recess;

the fourth body is provided with a first snap ring groove formed in the fifth mounting portion;

the first snap ring groove has an annular shape;

the first snap ring is a C-shaped elastic element;

the first snap ring is received in the first snap ring groove and mounted on the first end;

the fourth body is movable on the first end so that the first snap ring is locked on one of the two fifth limit portions, and the fourth body is positioned on two positions;

when the fourth body is moved to protrude from the first body partially, the fifth mounting portion is exposed;

the fifth body is mounted on the second end and provided with a sixth mounting portion mounted on the second end;

the sixth mounting portion is a polygonal recess;

the fifth body is provided with a second snap ring groove formed in the sixth mounting portion;

the second snap ring groove has an annular shape;

the second snap ring is a C-shaped elastic element;

the second snap ring is received in the second snap ring groove and mounted on the second end;

the fifth body is movable on the second end so that the second snap ring is locked on one of the two sixth limit portions, and the fifth body is positioned on two positions; and when the fifth body is moved to protrude from the first body partially, the sixth mounting portion is exposed.

* * * * *